(12) United States Patent
Tomomatsu et al.

(10) Patent No.: US 9,016,964 B2
(45) Date of Patent: Apr. 28, 2015

(54) PRINTER WITH TOUCH PANEL FOR RECEIVING CONTACT TRAJECTORY PATTERN FOR PRODUCING A PRINT

(71) Applicant: Brother Kogyo Kabushiki Kaisha, Nagoya-shi, Aichi (JP)

(72) Inventors: Yoshitsugu Tomomatsu, Nagoya (JP); Junya Kawai, Nagoya (JP); Zhi Yuan, Nagoya (JP); Yoshiyuki Kaneno, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/018,458

(22) Filed: Sep. 5, 2013

(65) Prior Publication Data

US 2014/0072358 A1   Mar. 13, 2014

(30) Foreign Application Priority Data

Sep. 13, 2012 (JP) ................................ 2012-201569

(51) Int. Cl.
| | |
|---|---|
| B41J 29/38 | (2006.01) |
| B41J 13/00 | (2006.01) |
| G06F 3/0488 | (2013.01) |
| B41J 29/70 | (2006.01) |
| B41J 3/407 | (2006.01) |
| B41J 3/46 | (2006.01) |

(52) U.S. Cl.
CPC ........... *B41J 13/0009* (2013.01); *G06F 3/0488* (2013.01); *B41J 29/70* (2013.01); *B41J 29/38* (2013.01); *B41J 3/4075* (2013.01); *B41J 3/46* (2013.01)

(58) Field of Classification Search
CPC ............ B41J 3/46; B41J 29/38; B41J 3/4075; G06F 3/17; G06F 3/0488; G06F 3/0488
USPC ......................................... 715/762, 763, 764
See application file for complete search history.

(56) References Cited

U.S. PATENT DOCUMENTS

| | | | |
|---|---|---|---|
| 6,765,559 B2 | 7/2004 | Hayakawa | |
| 2004/0125081 A1 | 7/2004 | Hayakawa | |
| 2010/0050076 A1 | 2/2010 | Roth | |
| 2010/0166313 A1* | 7/2010 | Arai ............................... | 382/187 |
| 2011/0285649 A1 | 11/2011 | Ogawa et al. | |
| 2013/0265267 A1* | 10/2013 | Victor ........................... | 345/173 |

FOREIGN PATENT DOCUMENTS

| | | | | |
|---|---|---|---|---|
| JP | 2000301776 A | * | 10/2000 | ................. B41J 3/36 |
| JP | 2001265481 | | 9/2001 | |

(Continued)

*Primary Examiner* — Daniel J Colilla
(74) *Attorney, Agent, or Firm* — McCarter & English, LLP

(57) ABSTRACT

The disclosure discloses a printer including a feeder, a printing head configured to form desired print and producing a print, a discharge port disposed on one side of a housing, a display portion configured to display a print image, an operation portion disposed above the display portion, a detecting device configured to detect the operation input through contact to the operation portion, a first trajectory determining portion configured to determine whether or not a contact trajectory with a first predetermined pattern along a first direction has been input in a state where the print image is displayed on the display portion, and a printing control portion configured to control the feeder and the printing head when it is determined that the contact trajectory has been input so as to produce the print corresponding to the print image displayed and to discharge the print.

5 Claims, 12 Drawing Sheets

(56) References Cited

FOREIGN PATENT DOCUMENTS

| JP | 2002192800 | 7/2002 | | |
| JP | 2002192800 A | * 7/2002 | ............. | B41J 29/00 |
| JP | 2005216071 | 8/2005 | | |
| JP | 2010049679 | 3/2010 | | |
| JP | 2011248416 | 12/2011 | | |

* cited by examiner

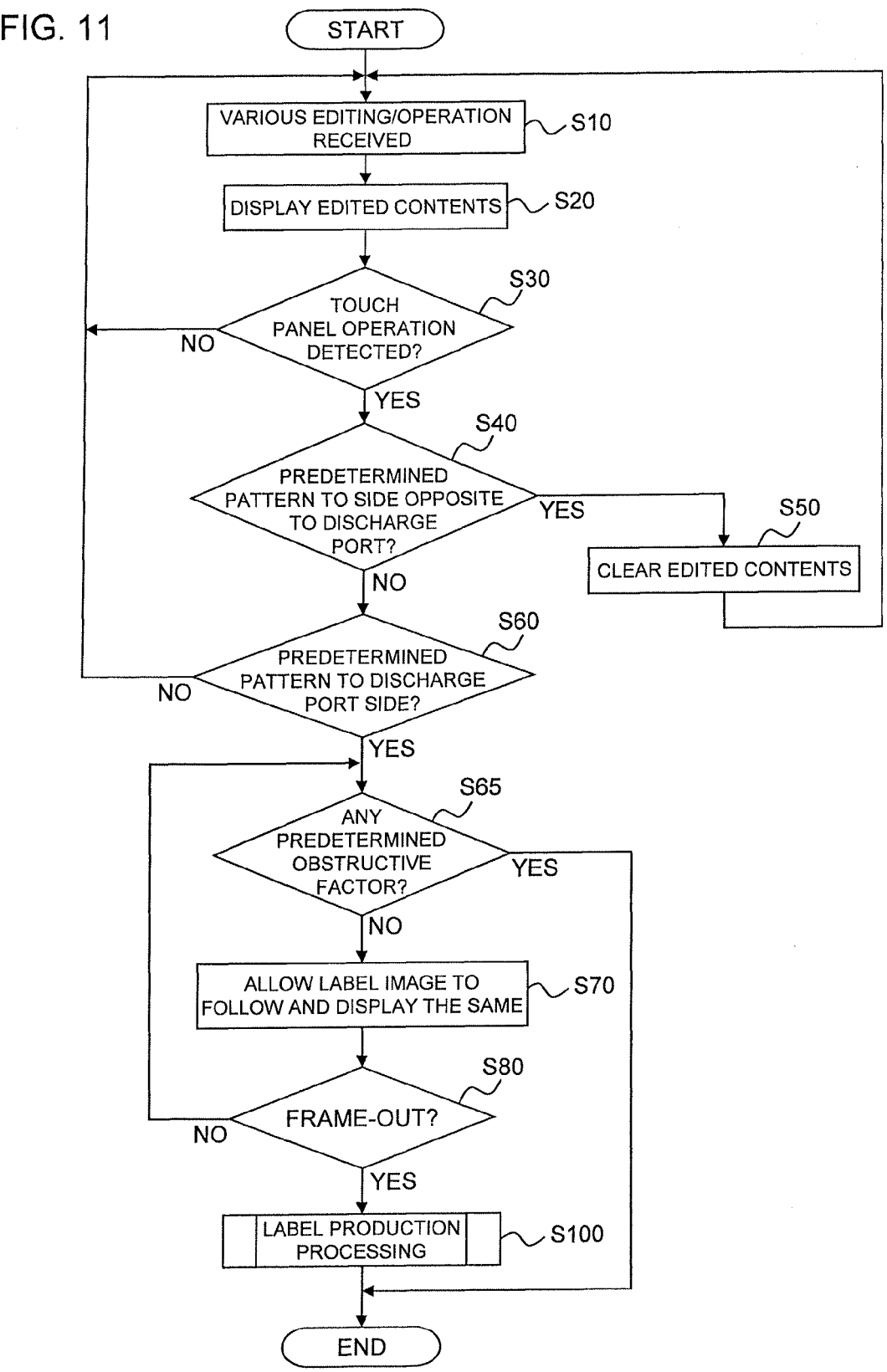

FIG. 12

| TRAJECTORY ATTRIBUTE | SWITCHABLE MODE |
|---|---|
| LONG (OR FAST) | FINE MODE |
| SHORT (OR SLOW) | NORMAL MODE |
| ONE TIME | ONE LABEL PRODUCTION |
| PLURAL TIMES | PLURAL LABELS PRODUCTION |

US 9,016,964 B2

PRINTER WITH TOUCH PANEL FOR RECEIVING CONTACT TRAJECTORY PATTERN FOR PRODUCING A PRINT

CROSS-REFERENCE TO RELATED APPLICATION

The present application claims priority from Japanese Patent Application No. 2012-201569, which was filed on Sep. 13, 2012, the disclosure of which is incorporated herein by reference in its entirety.

BACKGROUND

1. Field

The present invention relates to a printer which forms desired print on a medium to be printed.

2. Description of the Related Art

A printer for producing prints by forming print on a medium to be printed is known. In this prior art, a feeder (a platen roller) with a driving force given by a driving motor feeds a medium to be printed (a tape for print), desired print is formed by a print head (a thermal head) on the medium to be printed which is being fed, and a print (print label) is produced.

In the above described prior art, when a print is to be produced, first, an editing operation of contents of print to be formed (desired text characters, images and the like) is carried out by an operator through an appropriate text keys, numerical keys and the like. The edited contents are displayed on appropriate display device such as a liquid crystal panel, for example. In order to form print of the edited contents and to produce a print, the operator needs to newly press a print button or the like provided at a position separately away from the display device in a state where the above described edited contents are displayed on the display device so as to give an instruction to produce a print. Since a complex and cumbersome operation is needed in giving an instruction to produce a print as above, operability and convenience for the operator have been low.

SUMMARY

The present invention has an object to provide a printer which can give an instruction to produce a print easily and simply by an intuitive operation which is extremely easy to understand.

In order to achieve the above-described object, according to the aspect, there is provided a printer, comprising a feeder configured to feed a medium to be printed, a print head configured to form desired print on the medium to be printed fed by the feeder and producing a print, a housing that constitutes an outer shell of the printer and incorporates the feeder and the print head, a discharge port disposed on one side of the housing and configured to discharge the print produced by the print head to the outside of the housing, a display portion disposed on the housing and configured to display a print image expressing print contents of the print to be produced, an operation portion disposed above the display portion and capable of executing an operation input in a state where display on the display portion is seen through, a detecting device configured to detect the operation input through contact to the operation portion, a first trajectory determining portion configured to determine whether or not a contact trajectory with a first predetermined pattern along a first direction toward the discharge port side has been input in a state where the print image is displayed on the display portion on the basis of a detection result of the detecting device, and a printing control portion configured to control the feeder and the print head when it is determined by the first trajectory determining portion that the contact trajectory with the first predetermined pattern has been input so as to produce the print corresponding to the print image displayed on the display portion and to discharge the print from the discharge port.

BRIEF DESCRIPTION OF THE DRAWING

FIG. 11 is a flowchart illustrating the processing procedure executed by the control circuit.

FIG. 12 is a comparison table illustrating an example of a relationship between attributes of contact trajectories with predetermined patterns and production modes of the print label.

DETAILED DESCRIPTION OF THE PREFERRED EMBODIMENTS

An embodiment of the present invention will be described below by referring to the attached drawings. In the present embodiment, a case in which a printer of the present invention is applied to a print label producing apparatus will be illustrated.

<Outline Configuration of Print Label Producing Apparatus>

Figure 1:
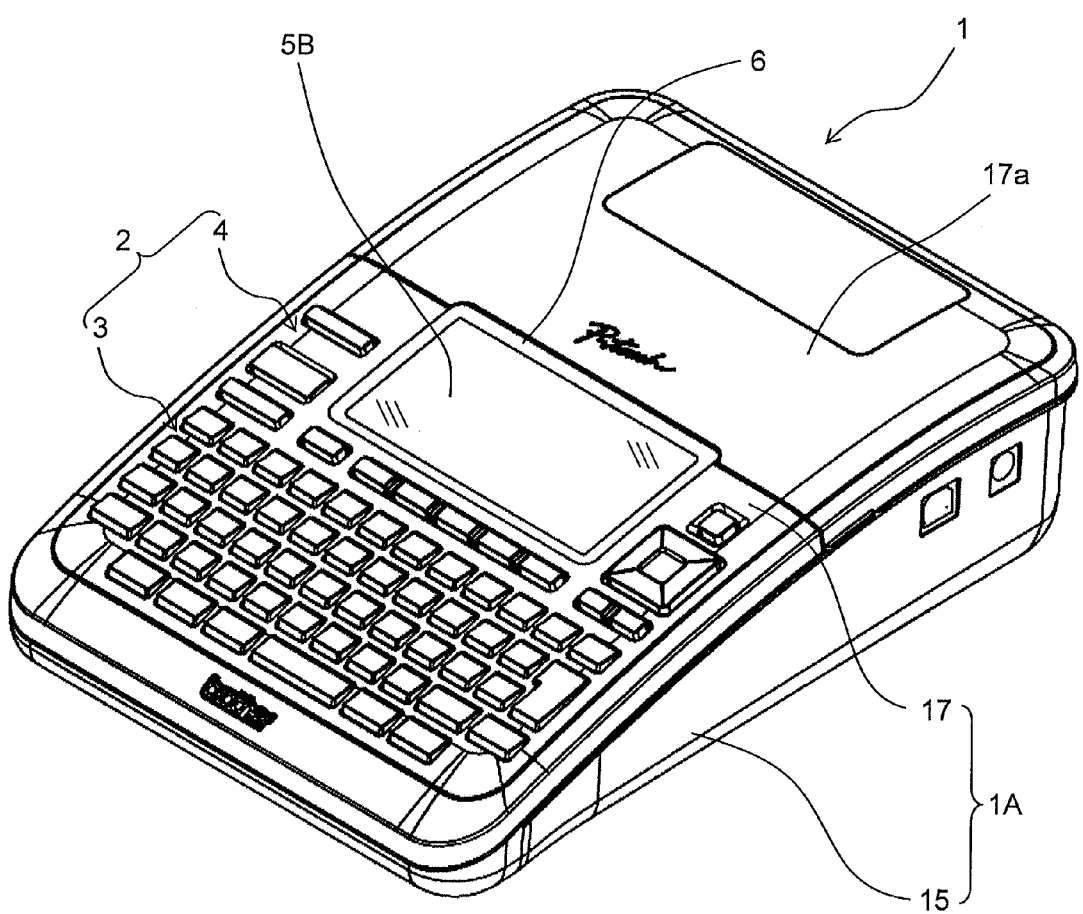
FIG. 1 is a perspective view from a diagonally upper direction illustrating an appearance of a print label producing apparatus of an embodiment of a printer of the present invention.
Figure 2:
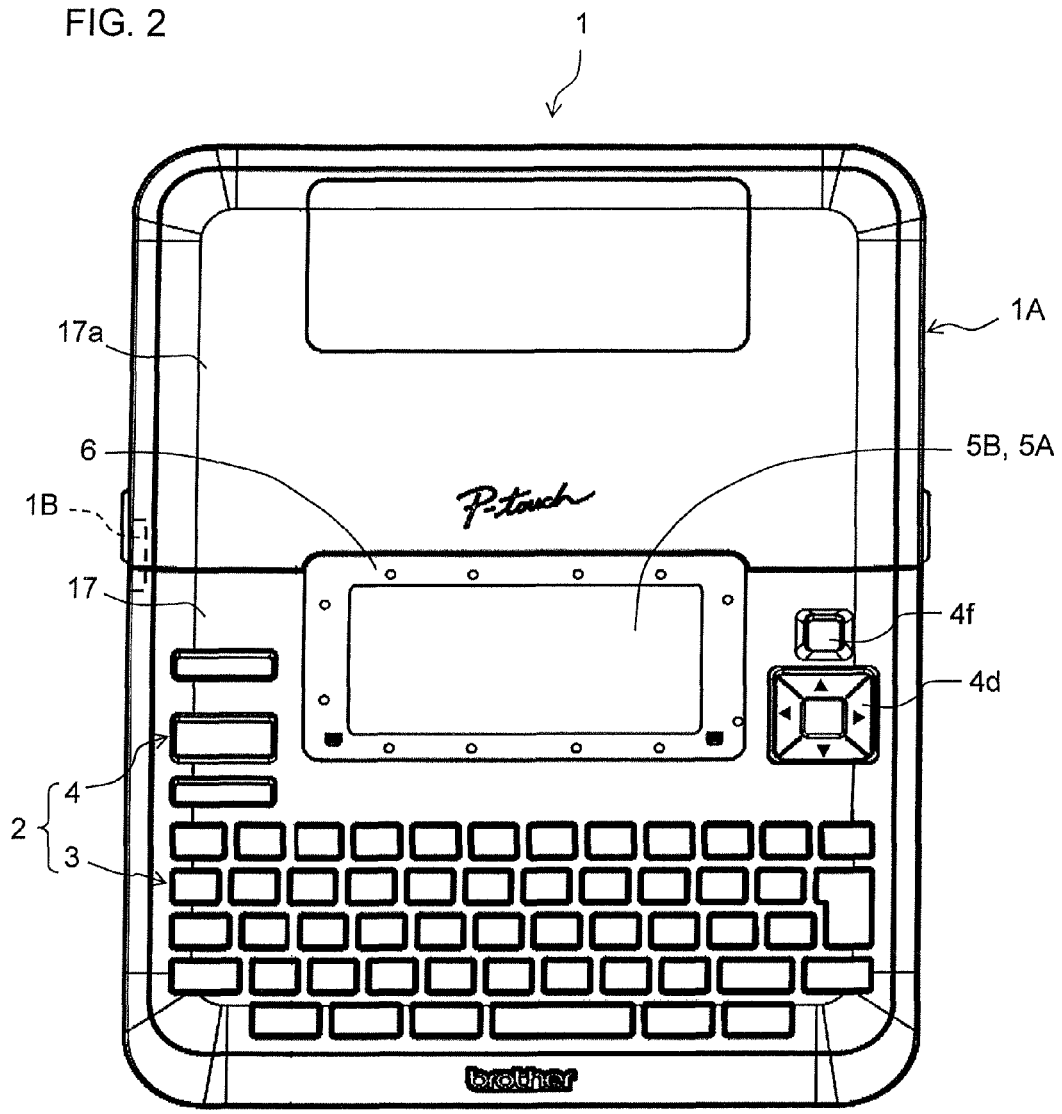
FIG. 2 is a plan view of the print label producing apparatus.

As illustrated in FIGS. 1 and 2, a print label producing apparatus 1 (corresponding to a printer) includes a housing 1A constituting an outer shell. The housing 1A is composed of a lower cover 15 made of resin and constituting a lower surface and a side surface of the apparatus and an upper cover 17 made of resin and constituting an upper surface of the apparatus. The upper cover 17 is provided with a cartridge cover 17a covering a cartridge holder 9 (See FIG. 4 which will be described later) on a rear part side, and the cartridge cover 17a can be opened/closed using a rear end portion as a fulcrum. On the front part side of the upper cover 17, an opening portion 6 having a rectangular opening shape, for example, is provided adjacent to the cartridge cover 17a. Inside the opening portion 6, a liquid crystal panel 5A (corresponding to a display portion. See FIG. 5 which will be described later, too) is provided and immediately above that, a touch panel portion 5B (corresponding to an operation portion) through which an operator can make a desired operation input while visually checking display contents of the above described liquid crystal panel 5A shown through is arranged. The operation portion 2 is provided in the periphery of the opening portion 6. On the operation portion 2, a keyboard 3 through which various operations such as character input are made and a function key group 4 for executing various functions of the print label producing apparatus 1 such as a power switch and up/down/right/left keys are arranged from the front to the rear of the upper cover 17. The function key group 4 includes a power button 4f at the right-side position of the opening portion 6, an up/down/right/left key 4d at the lower-side position and the like, for example.

Inside the housing 1A, on the lower side of the touch panel portion 5B, for example, a main substrate, not shown, on which electronic elements (IC chip and the like) constituting a control circuit 210 (See FIG. 5 which will be described later) which will be described later are mounted and a key substrate, not shown, connected to the above described control circuit 210 of the main substrate through a connector are provided. The key substrate has a plurality of key contacts corresponding to each key constituting the above described keyboard 3 and the function key group 4, and when the operator operates each key of the keyboard 3 and the function key group 4, the key contacts are closed, and whereby a function assigned to each key is executed.

Figure 3:
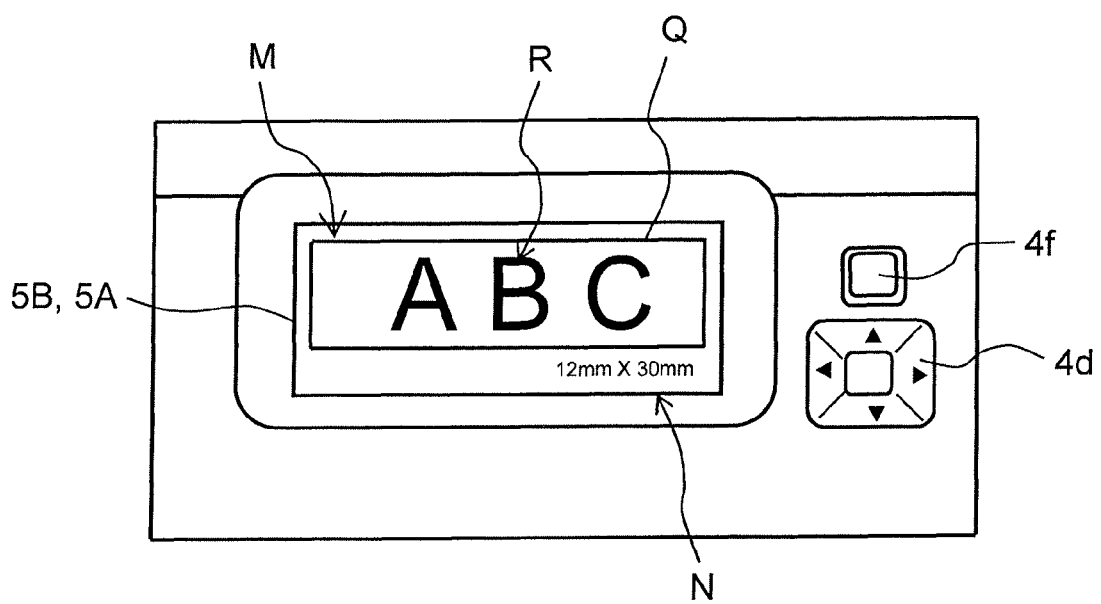
FIG. 3 is an explanatory diagram illustrating a display example of a label image on a liquid crystal panel.

For example, the operator performs editing by inputting characters, contour lines of labels and the like while changing input positions displayed on the liquid crystal panel 5A and visually checked through the touch panel portion 5B (hereinafter referred to simply as "displayed on the liquid crystal panel 5A" as appropriate) by using the keyboard 3, the up/down/right/left key 4d and the like. FIG. 3 illustrates an example of a state after the above described editing, in which a label image M (in this example, a print image R with the letters "ABC" and a rectangular label contour line image Q surrounding the print image R) is displayed on the liquid crystal panel 5A. The label image M edited as above is stored in a label image memory 220 of the control circuit 210. In FIG. 3, on the lower side of the label image M on the liquid crystal panel 5A, a dimension N of the print label L (the width of 12 mm and the length of 30 mm in this example) produced by using the above described label image M is displayed.

<Cartridge Holder and Cartridge>

Figure 4:
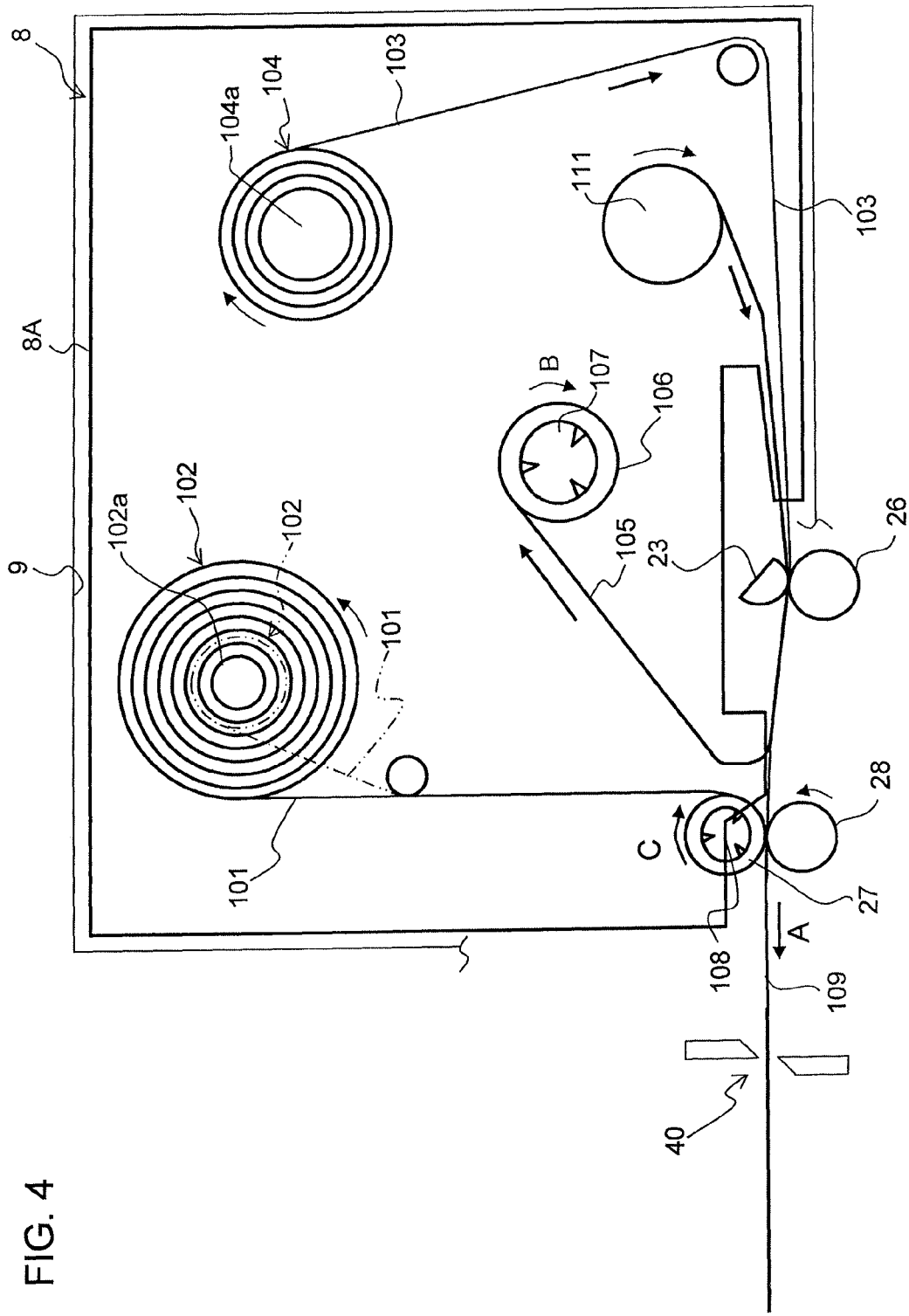
FIG. 4 is an enlarged plan view schematically illustrating an internal structure of a cartridge.

Inside the cartridge cover 17a of the housing 1A, as illustrated in FIG. 4, the above described cartridge holder 9 to which a cartridge 8 for supplying a label tape 109 with print can be detachably attached is provided. This cartridge holder 9 is closed by the above described cartridge cover 17a all the time, and if the cartridge cover 17a is opened, the cartridge holder 9 is exposed. In the cartridge holder 9, a ribbon take-up roller driving shaft 107 for taking up a used ink ribbon 105 in the cartridge 8 and a feeding roller driving shaft 108 for feeding a cover film 103 (corresponding to a medium to be printed) in the cartridge 8 are provided. Moreover, in the cartridge holder 9, a thermal head 23 (corresponding to print head) for performing desired print on the cover film 103 is provided so as to be located at its opening portion when the cartridge 8 is attached. The thermal head 23 is provided with a plurality of heat generating elements 23a (See FIG. 5 which will be described later) arrayed in a direction orthogonal to the feeding direction of the cover film 103, and print is performed on the cover film 103 by forming at least each dot on each print line formed by dividing the cover film 103 by print resolution in the feeding direction.

The cartridge 8 has a housing 8A, a first roll 102 (actually it has a spiral shape but illustrated as a concentric circular shape for facilitation in the figure) arranged in this housing 8A and around which a band-shaped base tape 101 is wound, a second roll 104 (actually it has a spiral shape but illustrated as a concentric circular shape for facilitation in the figure) around which the above described cover film 103 having substantially the same width as that of the above described base tape 101 but which is transparent is wound, a ribbon supply side roll 111 around which the above described ink ribbon 105 (heat transfer ribbon but not necessary if the print-receiving tape is a thermal tape) is wound, the ribbon take-up roller 106 taking up the ink ribbon 105 after print, and a feeding roller 27 rotatably supported in the vicinity of a tape discharge portion of the cartridge 8.

The first roll 102 has the above described base tape 101 wound around a reel member 102a. The base tape 101 is composed of a bonding adhesive layer, a base film, an affixing adhesive layer, and a separation sheet in this order from the inner wound side to the opposite side in lamination, for example. The second roll 104 has the above described cover film 103 wound around a reel member 104a.

The feeding roller 27 presses the above described base tape 101 and the above described cover film 103 on which print has been formed and bonds them while feeding so as to have the above described label tape 109 with print and feeds the obtained label tape 109 with print in a direction indicated by an arrow A in FIG. 4. The ribbon take-up roller 106 and the feeding roller 27 are rotationally driven in conjunction with each other as a driving force of a roller driving motor 208 (See FIG. 5 which will be described later) is transmitted to the above described ribbon take-up roller driving shaft 107 and the feeding roller driving shaft 108 (corresponding to feeder). During this rotational driving, a platen roller 26 arranged facing the thermal head 23 and a pressure roller 28 arranged facing the feeding roller 27 are similarly rotated.

Moreover, on the downstream side of the feeding roller 27 and the pressure roller 28 along a feeding path of the label tape 109 with print, a cutter 40 for cutting the label tape 109 with print to a predetermined length is provided. On the downstream side of the cutter 40, a label discharge port 1B (See above described FIG. 2 and FIG. 5 which will be described later) opened on one side (left side in above described FIG. 2) of the housing 1A is provided.

<Control System of Print Label Producing Apparatus>

Figure 5:
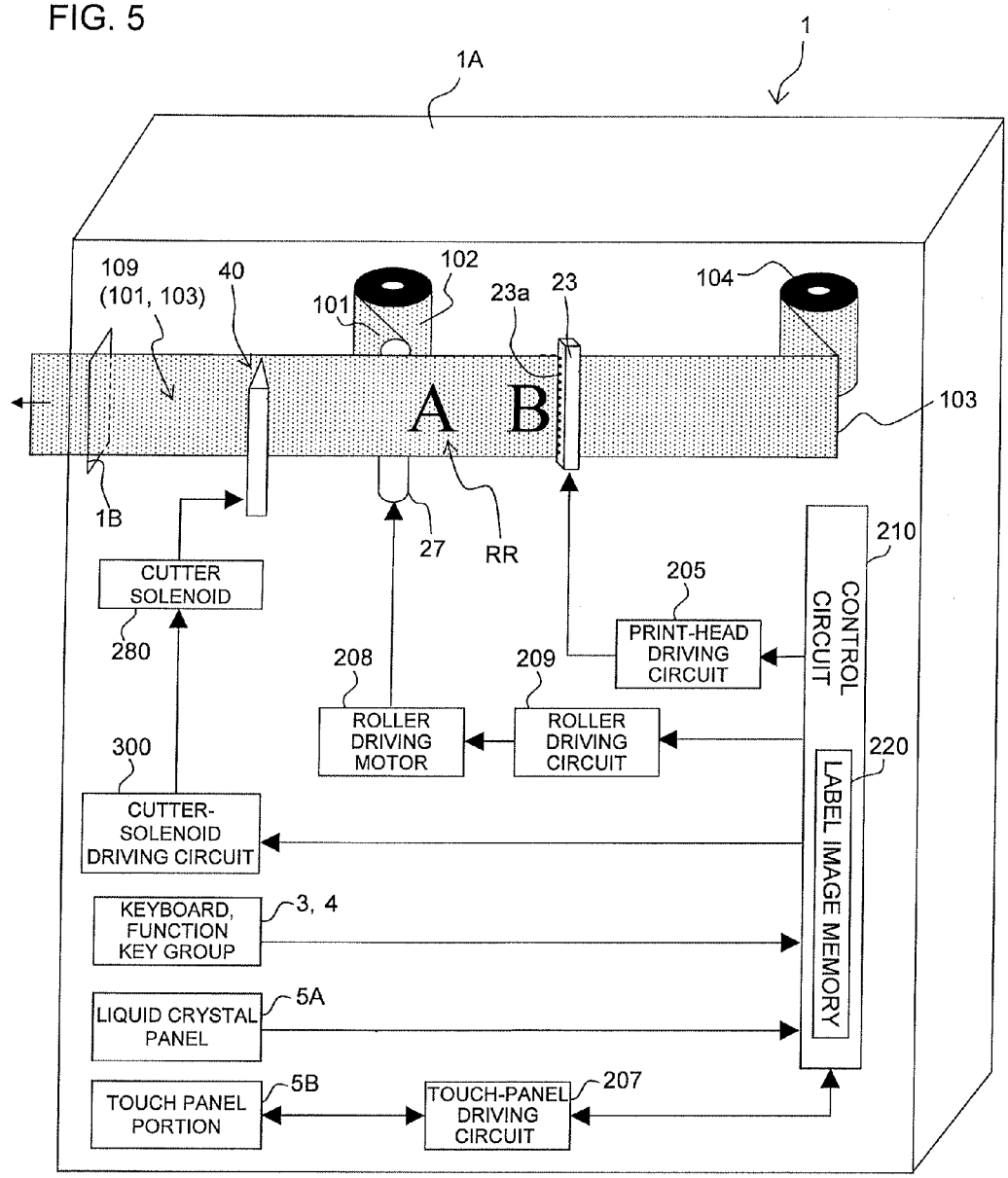
FIG. 5 is a conceptual diagram illustrating a control system of the print label producing apparatus.

A control system of the print label producing apparatus 1 will be described by using FIG. 5. In FIG. 5, in the print label producing apparatus 1, a print-head driving circuit 205 for applying current to the heat generating elements 23a of the above described thermal head 23, a touch-panel driving circuit 207 for driving the above described touch panel portion 5, a roller driving circuit 209 for controlling a roller driving motor 208 driving the feeding roller driving shaft 108 (See FIG. 4) and the ribbon take-up roller driving shaft 107 (See FIG. 4), a cutter-solenoid driving circuit 300 for controlling power feeding to a cutter solenoid 280 for causing the cutter 40 to perform a cutting operation, and the control circuit 210 for controlling operations of the entire print label producing apparatus 1 through the print-head driving circuit 205, the touch-panel driving circuit 207, the roller driving circuit 209, the cutter-solenoid driving circuit 300 and the like are provided. The keyboard 3 and the function key group 4 of the operation portion 2 are connected to the control circuit 210. The touch panel portion 5B is connected to the control circuit 210 through the above described touch-panel driving circuit 207. Then, an operation signal corresponding to each operation of the keyboard 3, the function key group 4, and the touch panel portion 5 is input to the control circuit 210. Moreover, the liquid crystal panel portion 5A is connected to the control circuit 210, and a label image such as a text on the basis of the editing operation of the above described keyboard 3, the function key group and the like and the operation of the touch panel portion 5 is displayed on the liquid crystal panel portion 5A. The control circuit 210 controls the print-head driving circuit 205, the roller driving circuit 209, the roller driving motor 208, the cutter-solenoid driving circuit 300 and the like in accordance with each setting by the operation of the operation portion 2 and the operation of the touch panel portion 5.

The control circuit 210 is a so-called microcomputer and is composed of, though detailed illustration is omitted, a CPU (calculating portion) which is a central processing unit, a ROM, a RAM and the like and is provided with the label image memory 220 composed of the RAM, for example. The control circuit 210 executes predetermined processing in accordance with a program stored in advance in the ROM (including a print label producing program for executing a print label producing method illustrated in FIGS. 8 and 9 and the like which will be described later) while using a temporary storage function of the RAM.

The control circuit 210 is supplied with power from a power circuit and is connected to a communication line, for example, via a communication circuit so that information can be exchanged among a route server, other terminals, general-purpose computers, information servers and the like, not shown, connected to this communication line.

<Basic Operation of Print Label Producing Apparatus>

In the print label producing apparatus 1 with the above described configuration, when the cartridge 8 is attached to the above described cartridge holder 9, the cover film 103 and the ink ribbon 105 are sandwiched between the thermal head 23 and the platen roller 26, and the base tape 101 and the cover film 103 are sandwiched between the feeding roller 27 and the pressure roller 28. On the other hand, the label image produced through the editing operation through the keyboard 3 and the function key group 4 of the operation portion 2 is temporarily stored in the label image memory 220 and also displayed on the liquid crystal panel portion 5A at the same time.

Then, along with driving of the feeding roller driving shaft 108, the ribbon take-up roller 106 and the feeding roller 27 are rotationally driven in directions indicated by an arrow B and an arrow C in FIG. 4, respectively, in synchronization. The pressure roller 28 is rotated by rotation of the feeding roller 27, the base tape 101 is fed out of the first roll 102 and supplied to the feeding roller 27, and the ink ribbon 105 is fed out of the ribbon supply roll 111 by rotation of the ribbon take-up roller 106. Moreover, the platen roller 26 is rotated by feeding-out of the ink ribbon 105, and the cover film 103 is fed out of the second roll 104 by rotation of the feeding roller 27, the pressure roller 28, and the platen roller 26 and supplied to the feeding roller 27. At this time, the label image stored as above is read out of the label image memory 220, and the plurality of heat generating elements 23a of the thermal head 23 are electrified by the print-head driving circuit 205 on the basis of the read-out label image. As a result, desired print RR (See FIG. 5) corresponding to the above described label image is printed on the back surface of the cover film 103 fed out of the second roll 104.

Then, the above described base tape 101 and the cover film 103 on which the above described printing has been finished are bonded and integrated by the above described feeding roller 27 and the pressure roller 28 and formed as the label tape 109 with print and fed out of the tape discharge portion to the outside of the cartridge 8. The ink ribbon 105 having finished with formation of the print RR on the cover film 103 is taken up by the ribbon take-up roller 106 by driving of the ribbon take-up roller driving shaft 107.

Subsequently, the cutter 40 on the downstream side in the label feeding direction of the feeding roller 27 is operated, and the label tape 109 with print is cut to a predetermined length, and a print label L with a predetermined length (See FIG. 6D which will be described later) is produced. The produced print label L (corresponding to a print) is discharged from the discharge port 1B of the housing 1A to the outside of the print label producing apparatus 1.

<Features of the Present Embodiment>

The feature of the present embodiment is that the corresponding print label L is produced by a touching operation by an operator using a fingertip or the like with respect to the label image M displayed on the liquid crystal panel 5A. The details will be described below in order by using FIGS. 6A to 6D and 7.

<Printing by Touching Operation of Label Image>

For example, in a state where the label image M is displayed on the liquid crystal panel 5A as in FIG. 6A, the operator touches a fingertip 10 on an area corresponding to the above described label image M in the touch panel portion 5B (hereinafter referred to simply as a "label image area" as appropriate). Then, the operator moves the fingertip 10 in contact in a direction toward the discharge port 1B side (left side in FIGS. 6A to 6D) (corresponding to a first direction).

Figure 6A:
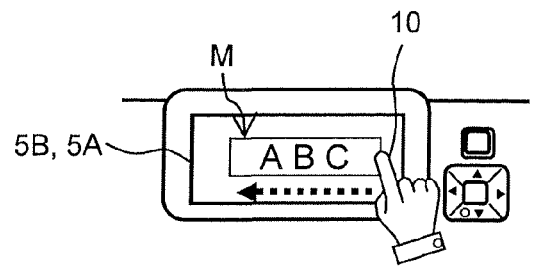
FIG. 6A is an explanatory diagram illustrating an example of an input operation on a touch panel portion.
Figure 6B:
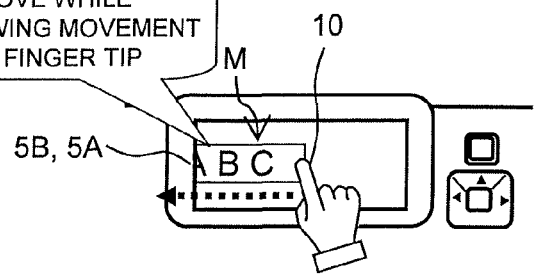
FIG. 6B is an explanatory diagram illustrating an example of an input operation on a touch panel portion.
Figure 6C:
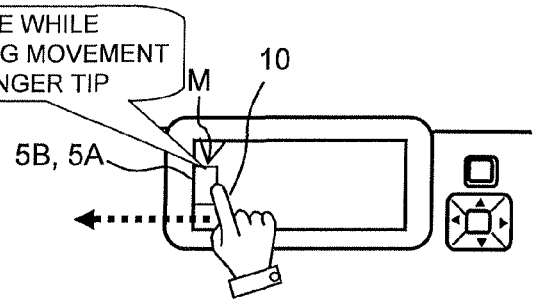
FIG. 6C is an explanatory diagram illustrating an example of an input operation on a touch panel portion.

When movement of the fingertip 10 in the above described first direction in the touch panel portion 5B is detected, the label image M displayed on the liquid crystal panel 5A moves in the above described first direction, following the movement of the fingertip 10 as illustrated in FIG. 6B. In the above described label image M, a portion which becomes the outside of a display range of the liquid crystal panel 5A due to the above described following movement (so-called frame-out) is no longer displayed on the liquid crystal panel 5A. As a result, due to the movement in the above described first direction, in a state illustrated in FIG. 6C, for example, only a right end portion in the figure of the label image M is displayed on the liquid crystal panel 5A.

Figure 6D:
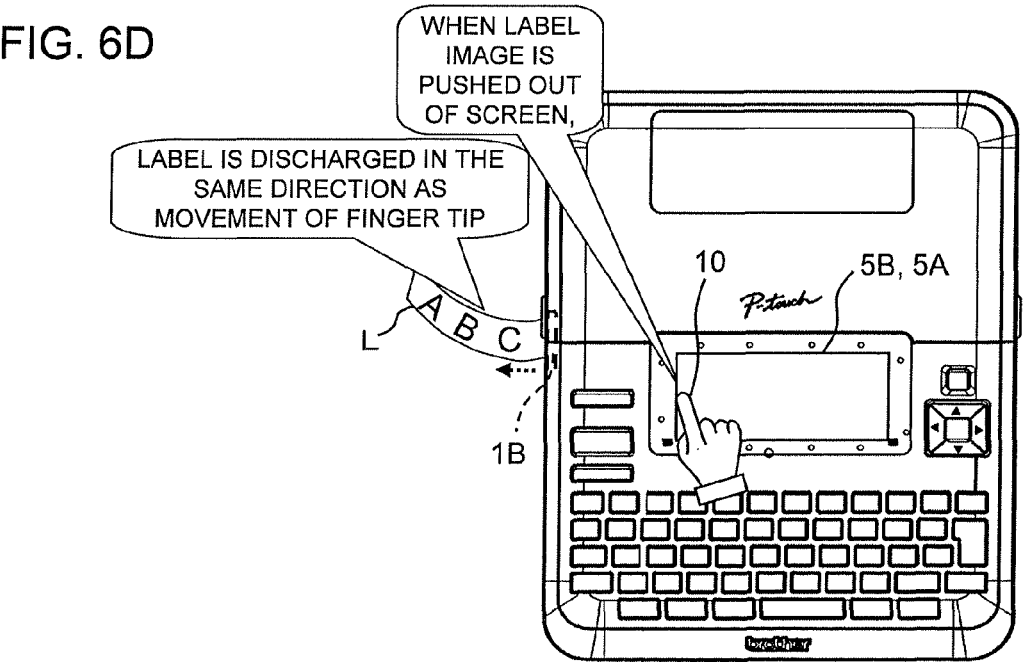
FIG. 6D is an explanatory diagram illustrating an example of an input operation on a touch panel portion.

Then, as illustrated in FIG. 6D, the fingertip 10 moves to the end portion on the discharge port 1B side of the touch panel portion 5B, and the label image M disappears from the liquid crystal panel 5A (the label image M is pushed out in the above described first direction). Then, upon this event of the label image M being pushed out as a trigger, the print label L on which the print corresponding to the above described label image M is formed is produced and discharged from the discharge port 1B in the same direction as the movement of the above described fingertip 10 (first direction).

<Cancellation of Label Image>

In the present embodiment, the label image M can be also cancelled (reset of the edited result) by a touching operation of the fingertip 10 in a direction opposite to the above. That is, after the operator touches the fingertip 10 to the label image area in a state where the label image M is displayed on the liquid crystal panel 5A as in FIG. 7A similarly to the above described FIG. 6A, the fingertip 10 in contact is moved in a direction (corresponding to a second direction) toward the side opposite to the discharge port 1B (right side in FIGS. 6A to 6D).

Figure 7A:
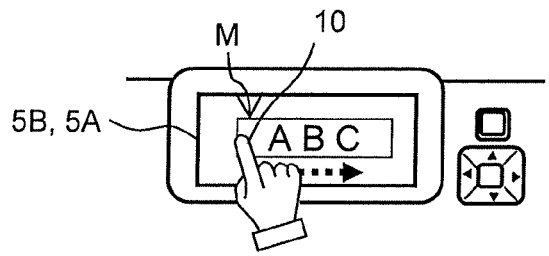
FIG. 7A is an explanatory diagram illustrating another example of the input operation on the touch panel portion.
Figure 7B:
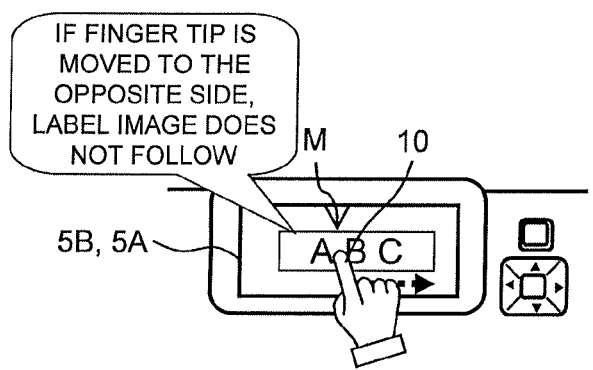
FIG. 7B is an explanatory diagram illustrating another example of the input operation on the touch panel portion.
Figure 7C:
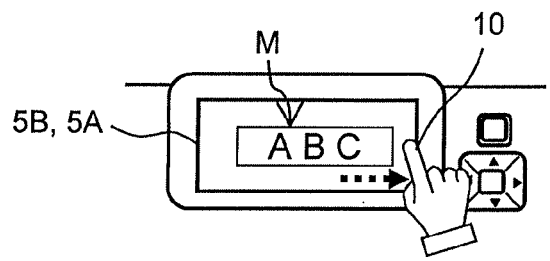
FIG. 7C is an explanatory diagram illustrating another example of the input operation on the touch panel portion.

When movement of the fingertip 10 in the above described second direction in the touch panel portion 5B is detected, unlike the above, the label image M displayed on the liquid crystal panel 5A does not follow the movement of the fingertip 10 (does not move in the above described second direction) as illustrated in FIGS. 7B and 7C but is displayed while remaining at that position.

Figure 7D:
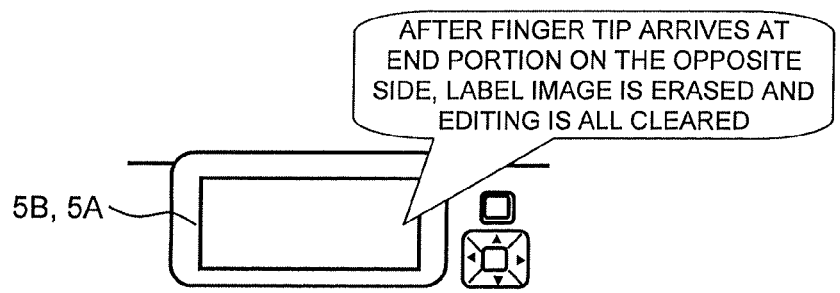
FIG. 7D is an explanatory diagram illustrating another example of the input operation on the touch panel portion.

Then, when the fingertip 10 moves to the end portion on the side opposite to the discharge port 1B of the touch panel portion 5B as illustrated in FIG. 7D, upon this event as a trigger, the label image M is erased from the liquid crystal panel 5A. At this time, all the edited results relating to the label image M are cleared, and the label image M is also erased from the above described label image memory 220.

<Control Procedure of Label Production>

A processing procedure executed by the control circuit 210 for realizing the above will be described by referring to FIG. 8. This processing is started when the power button 4f of the operation portion 2 in the print label producing apparatus 1 is pressed down, for example.

Figure 8:
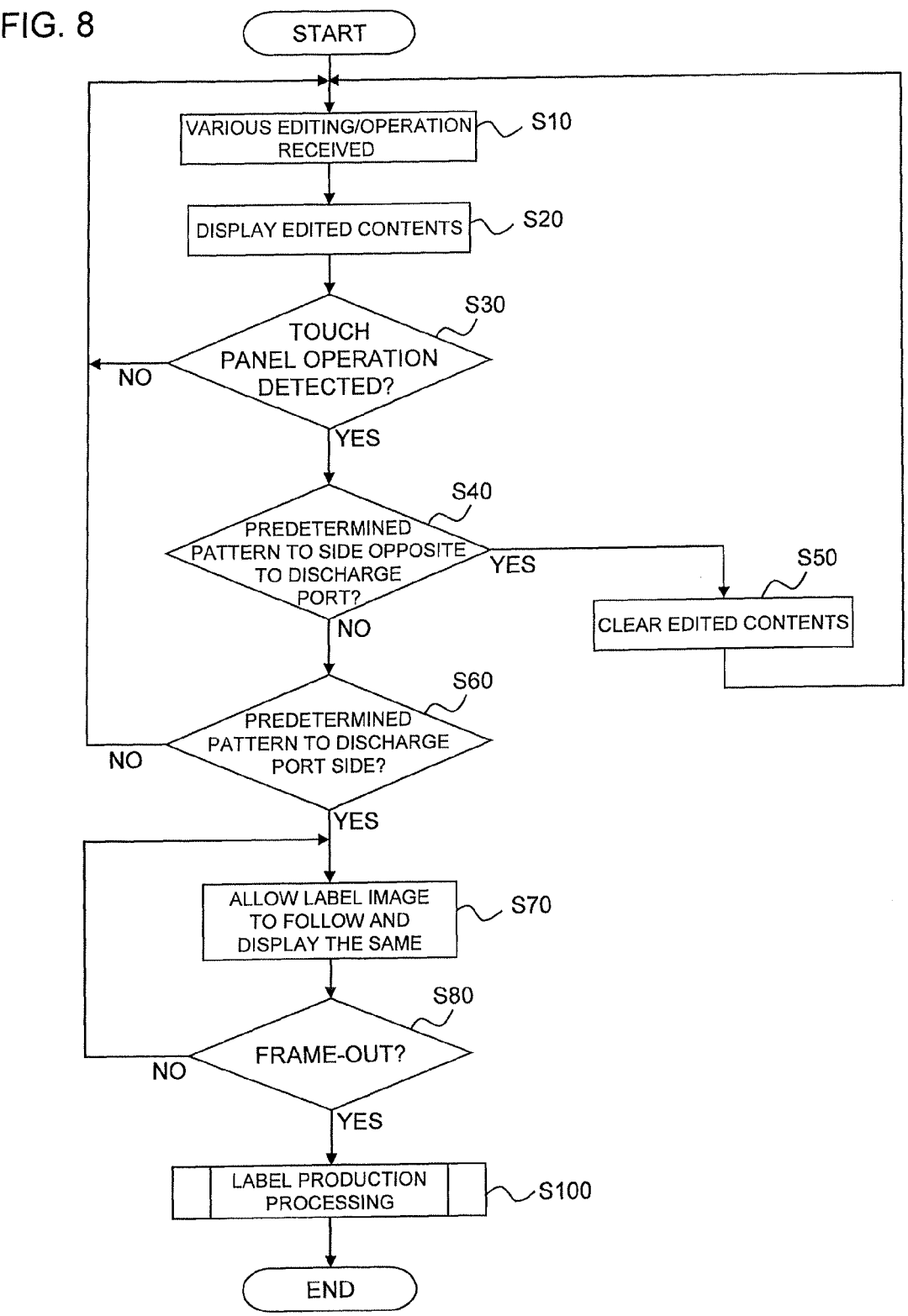
FIG. 8 is a flowchart illustrating a processing procedure executed by a control circuit.

In FIG. 8, at Step S10, first, the control circuit 210 receives the editing operation of the label image M by inputs of characters, symbols and the like and other operations by the operator through the keyboard 3, the function key group 4 and the like. Then, the procedure proceeds to Step S20.

At Step S20, the control circuit 210 outputs a control signal to the liquid crystal panel 5A so as to have the above described label image M in a state according to the edited contents received at the above described Step S10 displayed on the liquid crystal panel 5A. At this time, the above described displayed label image M after the editing is temporarily stored in the label image memory 220 of the control circuit 210. When Step S20 is finished, the procedure proceeds to Step S30.

At Step S30, the control circuit 210 determines whether or not the operation of the touch panel portion 5 by the operator has been detected through the touch panel driving circuit 207. The determination at Step S30 is not satisfied (S30: NO) until the operator touches the fingertip 10 to the touch panel portion 5, for example, the procedure returns to the above described Step S10 and repeats the same procedure. If the operator touches the fingertip 10 to the touch panel portion 5, for example, the determination at Step S30 is satisfied (S30: YES), and the procedure proceeds to Step S40. The control circuit 210 executing this Step S30 functions as detecting device described in each claim.

At Step S40, the control circuit 210 determines whether or not an operation of contact trajectory with a predetermined pattern (corresponding to a second predetermined pattern) toward the side opposite to the discharge port (second direction) of the above described housing 1A in the touch panel portion 5 on the basis of the detection result at the above described Step S30.

That is, as described by using the above described FIGS. 7A to 7D, the operation with the second predetermined pattern which is a contact trajectory in the above described second direction is set and stored at an appropriate location (in the control circuit 210, for example) in advance in a form associated with the above described editing result clearing processing. Then, when the contact trajectory with the above described second predetermined pattern is detected at the above described Step S30, the determination at this Step S40 is satisfied (Step S40: YES), and the procedure proceeds to Step S50. The control circuit 210 executing this Step S40 functions as second trajectory determining portion described in each claim.

At Step S50, the control circuit 210 outputs a control signal to the liquid crystal panel 5A and erases the label image M which has been displayed so far. Moreover, the control circuit 210 erases the label image M stored in the label image memory 220 and clears the edited contents received at the above described Step S10. Then, the procedure returns to the above described Step S10, and the same procedure is repeated. The control circuit 210 executing this Step S50 functions as erase control portion described in each claim.

On the other hand, at the above described Step S40, if the contact trajectory with the above described second predetermined pattern has not been detected at the above described Step S30, the determination at Step S40 is not satisfied (Step S40: NO), and the procedure proceeds to Step S60.

At Step S60, the control circuit 210 determines whether or not the operation of contact trajectory with the predetermined pattern (corresponding to a first predetermined pattern) toward the discharge port side (first direction) of the above described housing 1A in the touch panel portion 5 on the basis of the detection result at the above described Step S30.

That is, as described by using the above described FIGS. 6A to 6D, the operation with the first predetermined pattern which is a contact trajectory in the above described first direction is set and stored at an appropriate location (in the control circuit 210, for example) in advance in a form associated with the label producing processing. Then, when the contact trajectory with the above described first predetermined pattern has been detected at the above described Step S30, the determination at this Step S50 is satisfied (Step S50: YES), and the procedure proceeds to Step S70 which will be described later. If the contact trajectory with the above described first predetermined pattern has not been detected at the above described Step S30, the determination at Step S50 is not satisfied (Step S50: NO), the procedure returns to the above described Step S10, and the same procedure is repeated. The control circuit 210 executing this Step S50 functions as first trajectory determining portion described in each claim.

At Step S70, the control circuit 210 outputs a control signal to the liquid crystal panel 5A and has the label image M displayed on the liquid crystal panel 5A displayed while following movement of the fingertip 10 detected at the above described Step S30. The control circuit 210 executing this Step S70 functions as movement control portion described in each claim. Then, the procedure proceeds to Step S80.

At Step S80, the control circuit 210 determines whether or not the label image M displayed while following on the liquid crystal panel 5A at the above described Step S70 has been framed out (in other words, whether or not the label image M has been pushed out in the above described first direction so as to be located out of the display range of the liquid crystal panel 5A). While the label image M has not been framed out, the determination is not satisfied (Step S80: NO), the procedure returns to the above described Step S70, and the same procedure is repeated. When the label image M displayed on the liquid crystal panel 5A has been framed out, the determination is satisfied (Step S80: YES), and the procedure proceeds to Step S100.

At Step S100, the control circuit 210 executes production processing (which will be described later) of the print label L on the basis of the label image M received at the above described Step S10 and then, finishes this flow. The control circuit 210 executing this Step S100 functions as printing control portion described in each claim.

Detailed procedures of the label production processing at the above described Step S100 will be described by using FIG. 9.

Figure 9:
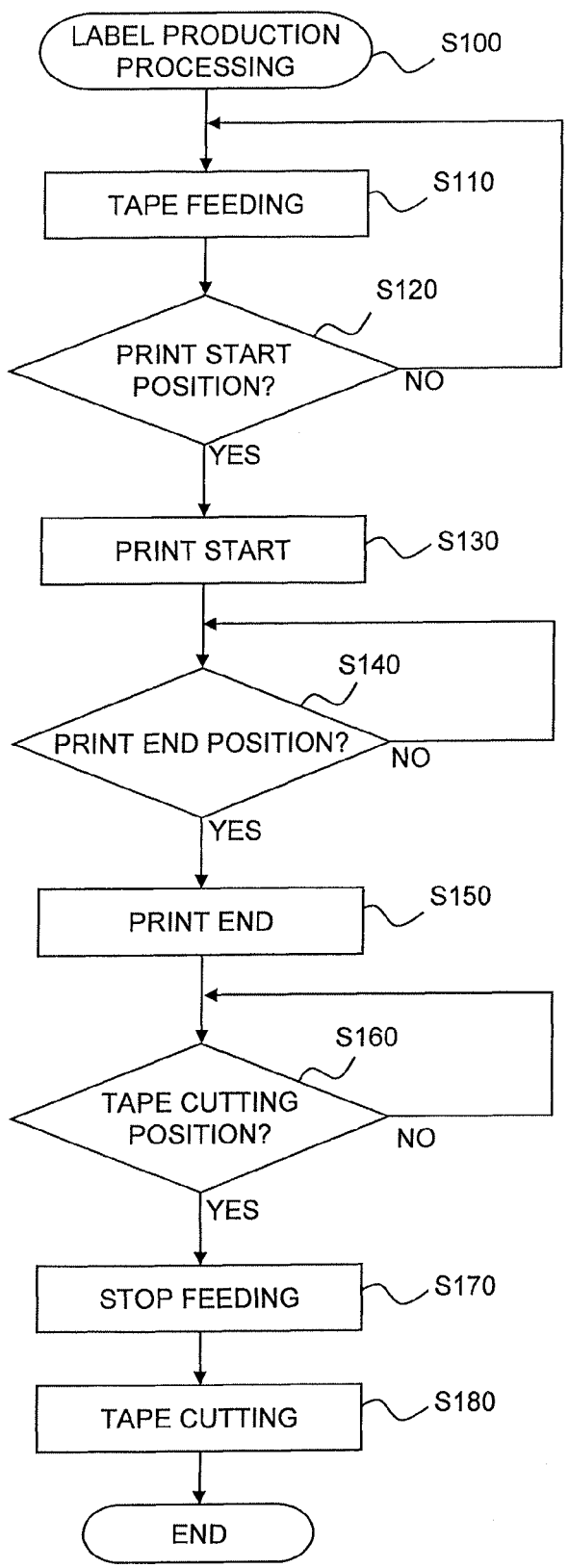
FIG. 9 is a flowchart illustrating details of Step S100 in FIG. 8.

In FIG. 9, first at Step S110, the control circuit 210 outputs a control signal to the roller driving circuit 209 so as to start driving of the roller driving motor 208. As a result, the feeding roller driving shaft 108 is rotationally driven and rotation of the feeding roller 27 is started, and as described above, feeding of the cover film 103, the base tape 101, and the label tape 109 with print in which they are bonded together is started. Then, the procedure proceeds to Step S120.

At Step S120, the control circuit 210 determines whether or not the position of the cover film 103 in the feeding direction has arrived at a predetermined print start position by a known method. If the position has not arrived at the print start position yet, the determination is not satisfied (Step S120: NO), the procedure returns to Step S110, and the same procedure is repeated. If the position has arrived at the print start position, the determination at Step S120 is satisfied (Step S120: YES), and the procedure proceeds to Step S130.

At Step S130, the control circuit 210 outputs a control signal (print data) to the print-head driving circuit 205 on the basis of the label image M received at the above described Step S10 in FIG. 8. As a result, the heat generating elements 23$a$ of the thermal head 23 are driven in accordance with the above described print data, and formation of the print RR corresponding to the print data on the cover film 103 is started. Then, the procedure proceeds to Step S140.

At Step S140, the control circuit 210 determines whether or not the position of the cover film 103 in the feeding direction has arrived at a predetermined print end position by a known method. If the position has not arrived at the print end position yet, the determination is not satisfied (Step S140: NO), the procedure waits in a loop. When the position has arrived at the print end position, the determination at Step S140 is satisfied (Step S140: YES), and the procedure proceeds to Step S150.

At Step S150, the control circuit 210 outputs a control signal to the print-head driving circuit 205, stops power feeding to the heat generating elements 23$a$ of the thermal head 23 corresponding to the above described print data, and finishes the printing. Then, the procedure proceeds to Step S160.

At Step S160, the control circuit 210 determines whether or not a position of the label tape 109 with print in the feeding direction has arrived at a tape cutting position by a known method. The determination is not satisfied (Step S160: NO) until the position arrives at the tape cutting position, and the procedure waits in a loop. When the position arrives at the tape cutting position, the determination at Step S160 is satisfied (Step S160: YES), and the procedure proceeds to Step S170.

At Step S170, the control circuit 210 outputs a control signal to the roller driving circuit 209 and stops driving of the roller driving motor 208. As a result, rotation of the feeding roller 27 is stopped, and feeding of the cover film 103, the base tape 101, and the label tape 109 with print in which they are bonded together is stopped. Then, the procedure proceeds to Step S180.

At Step S180, the control circuit 210 outputs a control signal to the cutter-solenoid driving circuit 300. As a result, the cutter solenoid 280 is electrified and excited, and the cutter 40 performs a cutting operation so as to cut the label tape 109 with print to a predetermined length. As a result, a print label having the print contents on the basis of the label image M edited by the operator is produced and discharged from the above described discharge port 1B to the outside of the housing 1A. Subsequently, this flow is finished.

The present invention is not limited to the above described embodiment but is capable of various variations within a range not departing from the gist and the technical idea thereof. Such variations will be described below in order.

(1) If label image is set to insufficient interlocking (or non-interlocking) at occurrence of obstructive factor:

In the present variation, in the case of occurrence of an obstructive factor (details will be described later) in production of the print label L which was assumed in advance, even if the fingertip 10 has moved to the discharge port 1B side (first direction) on the touch panel portion 5B as described above, the movement of the label image M on the liquid crystal panel 5A is set not to be sufficiently interlocked (or not to be interlocked). As a result, the occurrence of the obstructive factor can be notified to the operator.

Figure 10A:
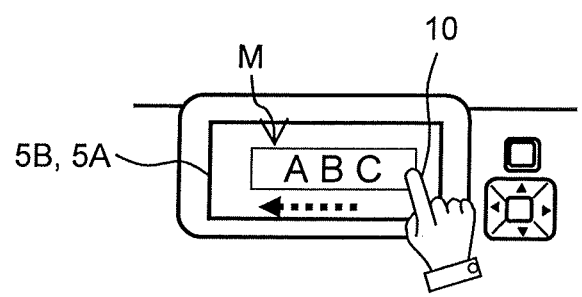
FIG. 10A is an explanatory diagram illustrating a variation in which movement of a label image is set to insufficient interlocking (non-interlocking) when an obstructive factor occurs in production of a print label.

That is, for example, similarly to the above described FIG. 6A, after the operator touches the fingertip 10 to the label image area in a state where the label image M is displayed on the liquid crystal panel 5A as in FIG. 10A, the operator moves the touching fingertip 10 in the direction (corresponding to the first direction) toward the discharge port 1B side (left side in FIGS. 6A to 6D). As a result, the label image M displayed on the above described liquid crystal panel 5A follows the movement of the fingertip 10 similarly to the above and moves in the above described first direction.

Figure 10B:
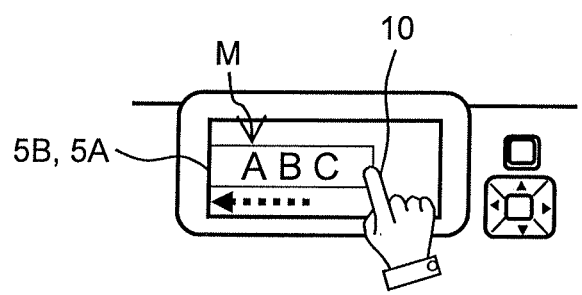
FIG. 10B is an explanatory diagram illustrating a variation in which movement of a label image is set to insufficient interlocking (non-interlocking) when an obstructive factor occurs in production of a print label.

At this time, in the present variation, if some obstructive factor described above has occurred, when a distal end (the left end in FIG. 10B) on the moving side of the label image M moving while following as above arrives at the end portion of the display area on the liquid crystal panel 5A, the label image M no longer follows the movement of the above described fingertip 10 but to the contrary, the image is displayed as movement (=movement in an insufficient form) in the liquid crystal panel 5A of bouncing back in a direction (corresponding to the above described second direction) opposite to the above described following direction. The obstructive factors at this time may include a case in which a high temperature inappropriate for printing of the thermal head 23 is detected by a temperature sensor provided separately, a case in which a state where the cartridge cover 17$a$ is opened (not sufficiently closed) is detected by an appropriate opening/closing sensor provided separately and the like. Alternatively, there may be a case in which it is detected that an output voltage of a battery is a low voltage not suitable for the printing operation when the print label producing apparatus 1 has a battery-driven configuration.

In the above, it is configured such that at occurrence of the above described obstructive factor, the label image M follows the movement of the fingertip 10 in the above described first direction, first, but this is not limiting, and it may be configured such that the label image does not follow (that is, does not move) at all.

A processing procedure executed by the control circuit 210 in the present variation will be described by using a flowchart illustrated in FIG. 11. In this flow, processing of the case in which the label image M does not follow at all at occurrence of an obstructive factor described above is used as an example for explanation.

In FIG. 11, this flowchart is different from the flowchart in FIG. 8 in a point that Step S65 is newly provided between Step S60 and Step S70 in the flowchart in FIG. 8. That is, after Step S10 to Step S60 similar to that in the above described FIG. 8, if the determination at Step S60 is satisfied (Step S60: YES), the procedure proceeds to the newly provided Step S65.

At the new Step S65, the control circuit 210 determines whether or not there is a predetermined obstructive factor to production of the print label L in the print label producing apparatus 1 described above. If there is the above described obstructive factor, the determination is satisfied (Step S65: YES), it is considered that production of the print label L is difficult (or inappropriate), and this flow is finished without going through Step S70 and Step S100.

If there is no above described obstructive factor, the determination at Step S65 is not satisfied (Step S65: NO), and Step S70, Step S80, and Step S100 similar to those in the above described FIG. 8 are executed. The control circuit 210 executing the above described Step S65 functions as obstruction determining portion described in each claim.

(2) If printing form is changed in accordance with length of contact trajectory to touch panel portion and the like:

That is, when the contact trajectory with the predetermined pattern (first pattern) to the discharge port 1B side is input by the above described fingertip 10 and the like on the touch panel portion 5B, a form of the print label L producing operation may be changed in accordance with attributes such as the length, number of times, speed and the like of the contact trajectory.

An example of a relationship between the attributes of the contact trajectory with the above described predetermined pattern and the form of corresponding print label L producing operation (production mode of the print label) set in advance and executed in the present variation is illustrated in FIG. 12.

As illustrated in FIG. 12, in this example, when the contact trajectory with the first predetermined pattern detected as above is long (or a moving speed of the trajectory is fast), printing of the print label L is performed in a fine mode determined in advance. On the other hand, when the detected contact trajectory with the first predetermined pattern is short (or the moving speed of the trajectory is slow), printing of the print label L is performed in a normal mode. The fine mode is a known mode in which printing finer than the above described normal mode is made possible. That is, it is a mode in which a printing speed realized by collaboration between the thermal head 23 and the feeding roller driving shaft 108 on the basis of control of the control circuit 210, for example, is made slower than that of the above described normal mode, and an image quality is made finer (more favorable).

Moreover, upon the detection as above, if contact with the first predetermined pattern to the touch panel portion 5B is made only once (not repeated plural times), production of a single print label L is performed. On the other hand, if contact with the first predetermined pattern to the touch panel portion 5B is repeated plural times, production of a plurality of the print labels L in the number equal to the number of times is performed.

(3) Others

Figure 10C:
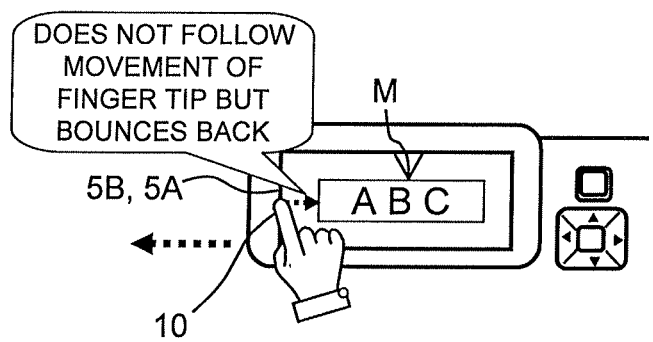
FIG. 10C is an explanatory diagram illustrating a variation in which movement of a label image is set to insufficient interlocking (non-interlocking) when an obstructive factor occurs in production of a print label.

The setting of the number of the labels to be printed in the variation (2) described above may be made changeable to be increased/decreased even in the middle of actual production of the print label L on the basis of control of the control circuit 210. Moreover, it may be configured such that when the operator performs the operation in the second direction described by using the above described FIGS. 10A to 10C in the middle of production of the print label L, the control circuit 210 stops power feeding to the thermal head 23 at that point of time so as to stop formation of the print RR (and to discharge the label in an unprinted state).

Moreover, not limited to switching in the "printing mode" and "number of produced labels" as in the above described variation (2), setting such as "addition of frame or not", "setting of text character font", "decoration of text characters or not" and the like can be set by an operation using the contact trajectory on the above described touch panel portion 5B. Alternatively, setting of "automatic cutting of label tape 109 with print or not" by the cutter 40 after production of the above described single print label L can be made by an operation using the contact trajectory on the above described touch panel portion 5B (if automatic cutting is not to be performed, a plurality of the labels L is continuously produced without being divided from each other). Moreover, in these cases, the operation may be performed not by the contact trajectory in the above described first direction or second direction and the like on the touch panel portion 5B but by the contact trajectory in a direction (vertical direction in FIGS. 6A to 6D, for example) orthogonal to the above described first and second directions.

In the above, the arrows illustrated in FIG. 5 indicate examples of flows of signals and do not limit the flow directions of the signals.

Moreover, the flowcharts illustrated in FIGS. 8, 9, and 11 are not intended to limit the present invention to the procedures illustrated in the above described flows but addition/deletion or change of order and the like of the procedures may be made within a range not departing from the gist and technical idea of the present invention.

Moreover, other than those described above, methods of the above described embodiment and the variations may be used in combination as appropriate.

Besides, though not individually exemplified, the present invention is put into practice with various changes added within a range not departing from the gist thereof.

What is claimed is:

1. A printer, comprising:
   a feeder configured to feed a medium to be printed;
   a print head configured to form desired print on said medium to be printed fed by said feeder and producing a print;
   a housing that constitutes an outer shell of the printer and incorporates said feeder and said print head;
   a discharge port disposed on one side of said housing and configured to discharge said print produced by said print head to the outside of said housing;
   a display portion disposed on said housing and configured to display a print image expressing print contents of said print to be produced;
   an operation portion disposed above said display portion and capable of receiving an operation input in a state where a display on the display portion can be seen through the operation portion;
   a detecting device configured to detect said operation input through contact to said operation portion;
   a first trajectory determining portion configured to determine whether or not a contact trajectory with a first predetermined pattern along a first direction toward said discharge port side has been input in a state where said print image is displayed on said display portion on the basis of a detection result of said detecting device; and a printing control portion configured to control said feeder and said print head when it is determined by said first trajectory determining portion that the contact trajectory with said first predetermined pattern has been input so as to produce said print corresponding to said print image displayed on said display portion and to discharge the print from said discharge port.

2. The printer according to claim 1, further comprising:
a second trajectory determining portion configured to determine whether or not a contact trajectory with a second predetermined pattern along a second direction substantially opposite to said first direction has been input to the operation portion in the state where said print image is displayed on said display portion on the basis of a detection result of said detecting device; and
an erase control portion configured to erase said print image displayed on the display portion by controlling said display portion when it is determined by said second trajectory determining portion that the contact trajectory with said second predetermined pattern has been input top the operation portion.

3. The printer according to claim 1, further comprising:
a movement control portion configured to control said display portion so as to move a display position of the displayed print image to said discharge port side while following the contact trajectory along said first direction when it is determined by said first trajectory determining portion that the contact trajectory having said predetermined pattern has been input to the operation portion.

4. The printer according to claim 3, further comprising:
an prevention determining portion configured to determine occurrence of a predetermined preventive factor preventing production of said print, wherein
even when it is determined by said first trajectory determining portion that the contact trajectory with said first predetermined pattern has been input, if it is determined by said prevention determining portion that said preventive factor has occurred,
said printing control portion does not produce said print by control of said feeder and said print head; and
said movement control portion does not move said print image to said discharge side or moves said print image to said discharge side and then returns said print image to its original position.

5. The printer according to claim 1, wherein
when said first trajectory determining portion determines that a contact trajectory with said first predetermined pattern has been input, said printing control portion determines trajectory attributes in order to control a printing mode of said print feeder and said print head.

\* \* \* \* \*